United States Patent
Hamilton, Jr.

(10) Patent No.: US 11,387,632 B2
(45) Date of Patent: Jul. 12, 2022

(54) POWER DISTRIBUTION BOX WITH VENT

(71) Applicant: Sumitomo Wiring Systems, Ltd., Mie (JP)

(72) Inventor: Kyles O. Hamilton, Jr., Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 56 days.

(21) Appl. No.: 16/911,192

(22) Filed: Jun. 24, 2020

(65) Prior Publication Data

US 2021/0408771 A1    Dec. 30, 2021

(51) Int. Cl.
    *H02B 1/56*    (2006.01)
    *A45C 11/00*   (2006.01)
    *H02B 1/46*    (2006.01)

(52) U.S. Cl.
    CPC .............. *H02B 1/56* (2013.01); *A45C 11/00* (2013.01); *H02B 1/46* (2013.01); *H02B 1/565* (2013.01); *A45C 2011/002* (2013.01)

(58) Field of Classification Search
    None
    See application file for complete search history.

(56) References Cited

U.S. PATENT DOCUMENTS

| | | | |
|---|---|---|---|
| 9,795,054 B2* | 10/2017 | Reynov | H05K 7/20127 |
| 10,028,372 B2* | 7/2018 | Ritter | H05K 7/20409 |
| 10,673,210 B2* | 6/2020 | Bellows | H05K 5/0213 |
| 2004/0114289 A1* | 6/2004 | Eiselt | H02B 13/025 |
| | | | 361/62 |
| 2011/0241932 A1* | 10/2011 | Rowe | H05K 7/20563 |
| | | | 342/175 |
| 2015/0230352 A1* | 8/2015 | Hashikura | B60R 16/0238 |
| | | | 174/547 |
| 2016/0042896 A1* | 2/2016 | Kingston | H02B 1/565 |
| | | | 218/157 |

* cited by examiner

*Primary Examiner* — Courtney L Smith
(74) *Attorney, Agent, or Firm* — Honigman LLP (57) ABSTRACT

A power distribution box configured to house a plurality of electronic components is provided. The electronic components are mounted to a lower case. An upper case is mounted to the lower case and spaced apart from the lower case so as to define a storage compartment. The upper case includes a vent configured to allow heat generated by electric components to escape. In particular, the vents are registered so as to be above selective heat generating electric components.

18 Claims, 7 Drawing Sheets

POWER DISTRIBUTION BOX WITH VENT

TECHNICAL FIELD

The present specification generally relates to a power distribution box assembly and more particularly to a power distribution box assembly having a vent so as to release heat.

BACKGROUND

In general power distribution boxes include an upper case and a lower case that are coupled together. The lower case is configured to hold an electric circuit assembly having a circuit board and a plurality of electric components mounted to the circuit board. The electric components are configured to distribute power from a power source.

The upper case is spaced apart from the lower case so as to define a storage space. The electronic components are housed within the storage space, some of which generate heat. As packaging constraints require the electronic components to be housed in a relatively tight storage space, heat from the electronic components are trapped within the power distribution box which may cause the power distribution box to deform or weaken. In some instances, the heat is sufficient to melt the upper cover which may damage the electronic components.

Accordingly, it remains desirable to have a power distribution box wherein heat generated by the electronic components are released from within the storage space so as to maintain the structural integrity of the power distribution box and the functionality of the electronic components.

SUMMARY

In one embodiment an upper case for use in a power distribution box includes a lower case coupled to the upper case so as to form a storage compartment. In particular, the upper case is mounted on top of the lower case. The storage compartment is configured to house a plurality of electric components. The lower case includes a plurality of inner walls dimensioned to hold electric components.

The upper case includes a top wall which is configured to cover the lower case and a vent is disposed on the top wall of the upper case. The vent defines an opening. In one aspect, the vent includes a side wall that bounds the vent so as to be raised above a top surface of the top wall of the upper case. The side wall is concentric to the shield so as to define a gap. The gap is generally an annular gap allowing heat to escape from the storage compartment.

The vent may be configured to direct a thermal path. In one aspect, the vent may include a shield that is disposed above the opening so as to allow heat to escape from the storage compartment in a radial manner.

In one aspect the vent is a generally circular opening and the outer surface of the side wall has a constant radius which is larger than the opening. The inner surface of the side wall may be angled to facilitate heat escaping through the gap and the outer surface of the shield is angled inwardly from the top surface of the shield towards a bottom surface of the shield. The shield may include an annular lip which is spaced apart from the side wall. Accordingly, the vent directs heat from electric components in a radial manner.

In other aspects of the disclosure the top surface of the shield may be a generally planar surface that is coplanar with the top edge of the side wall. The shield may be suspended and fixed above the vent by a support leg. The support leg may be disposed on a bottom surface of the shield and connected to the top wall of the upper case so as to fix the shield in position; in particular, to fix the shield in a suspended position above the vent.

In another aspect, a power distribution box is provided. The power distribution box is configured to house a plurality of electric components. The power distribution box includes a lower case configured to hold a plurality of electric components. The upper case is mounted to the lower case and may be fastened thereto using conventional fastening means such as clips, tabs, latches and the like.

A cover may be configured to mount onto the upper case. The upper case is dimensioned to cover the lower case and protect the electric components. A vent is disposed on the upper case. The vent being an opening, it is disposed above at least one of the electric components. A side wall bounds the opening so as to be raised above the top surface of the upper case and a shield is disposed above the opening and the side wall is concentric to the shield so as to center the shield above the opening thereby allowing heat to escape.

Accordingly, the upper case and the power distribution box provide a path for heat to escape the storage compartment so as to prevent the upper case and electronic components from being damaged from a thermal load.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Referring generally to the figures, embodiments of the present disclosure include an upper case for use in a power distribution box and a power distribution box having a vent configured to allow heat generated by electric components to escape. In particular, the vents are registered so as to be above selective heat generating electric components.

Figure 1:
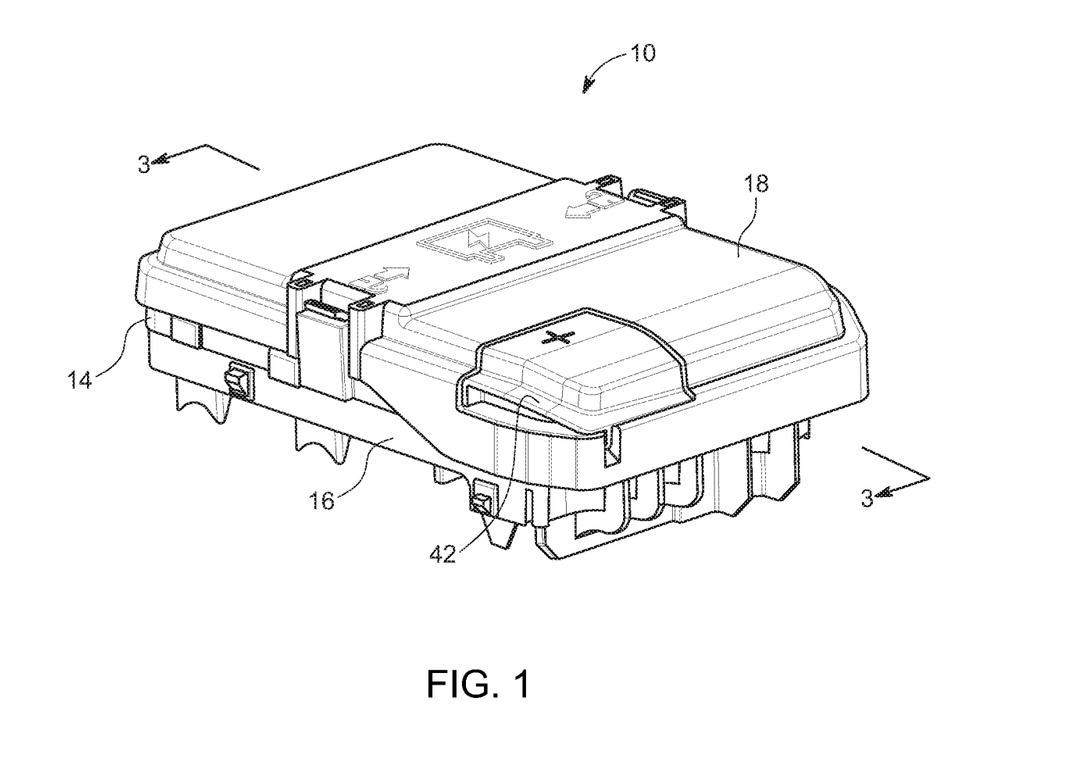
FIG. 1 is an exemplary depiction of a power distribution box according to one or more embodiments illustrated herein.
Figure 2:
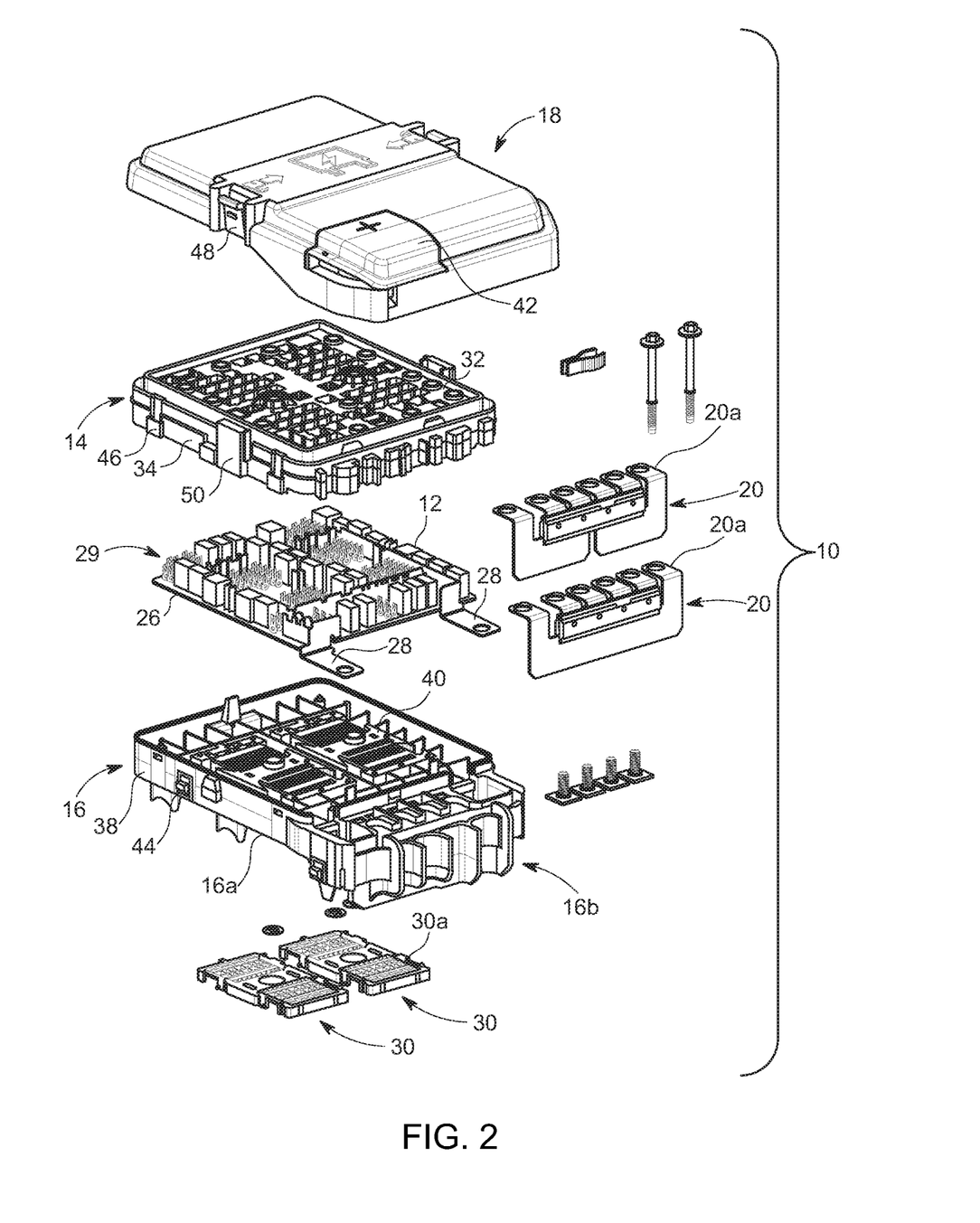
FIG. 2 is an exploded view of the power distribution box shown in FIG. 1.

With reference now to FIGS. 1 and 2 an illustrative embodiment of a power distribution box 10 is provided. The power distribution box 10 is configured to house a plurality of electric components 12. Some of the electric components 12 are components which have a high heat generation which is a heat that is sufficient to melt or deform a polymer. Such electric components 12 illustratively include a relay switch 12a that when actuated may generate a temperature over 135 degrees Celsius.

The electric components 12 are configured to direct power from a power source to various actuators, motors and devices. For illustrative purposes, the power distribution box 10 disclosed herein is described within the context of an automotive vehicle. However, it should be appreciated that the power distribution box 10 is described herein in the context of an automotive vehicle for illustrative purposes and that the description of the automotive vehicle is not limiting to the scope of the appended claims.

The power distribution box 10 includes an upper case 14, a lower case 16 and a cover 18. The upper case 14 and the lower case 16 are dimensioned to form a generally cuboidal shape. The upper case 14 is mounted onto the lower case 16 and the cover 18 is mounted onto the upper case 14. The upper case 14 and the lower case 16 are formed of a material suitable for injection molding. For instance, the upper case 14 and the lower case 16 may be formed of a polypropylene. Such material may have a melting point of at least 135 degrees Celsius. It should be appreciated that the shape and dimensions of the power distribution box 10 are provided for illustrative purposes only and it may deviate from what is shown in the drawings without limiting the scope of the appended claims.

An electric bus bar 20 having a plurality of terminals 20a is mounted to a terminal connection housing 22 disposed on a side of the lower case 16. The electric bus bar 20 is formed of an electrically conductive material such as steel and may be stamped as a single unit. The electric bus bar 20 is configured to be connected to a power source, such as a vehicle battery (not shown).

An electric circuit assembly 24 is configured to be seated onto the lower case 16. The electric circuit assembly 24 includes a printed circuit board 26 having an electric trace and the electric components 12 are mounted to the printed circuit board 26. A plurality of terminal blades 28 are mounted to the printed circuit board 26.

In one aspect, the power distribution box 10 may include a pin protector plate 30 having a plurality of slits 30a which extend along a height of the pin protector plate 30. The pin protector plate 30 is configured to be mounted to a bottom surface 16a of the lower case 16 so as to protect the terminal blades 28. The pin protector plate 30 may be removed so as to allow for terminal connectors (not shown) to be mounted to the terminal blades so as to complete an electric connection.

The upper case 14 includes a base 32. The base 32 has a generally planar surface. The upper case 14 includes an upper side wall 34. The upper side wall 34 bounds a peripheral edge of the base 32. The upper case 14 is mounted onto the lower case 16 such that the base 32 is spaced apart from the lower case 16 so as to define a storage compartment 36.

The lower case 16 includes a lower wall 38 and a floor 40. The lower wall 38 bounds the floor 40 so as to define a bottom portion of the storage compartment 36. The lower wall 38 is configured to support the electric circuit assembly 24. A portion of the lower wall 38 includes an electric bus bar housing 16b configured to support the electric bus bar 20.

The cover 18 is configured to be mounted onto the upper case 14. Preferably, the cover 18 is configured to be removably attached to the upper case 14. In one aspect, the cover 18 may include a terminal cover 42. The terminal cover 42 may be opened so as to provide access to a jump start terminal (not shown).

As discussed above, the upper case 14 and the lower case 16 are formed of a polymer suitable for injection molding. As is known, such polymers have a melting point anywhere between 100 to 200 degrees Fahrenheit. It should also be appreciated that the structural integrity of the material degrades over time with the application of a thermal load.

The upper case 14 and the lower case 16 are fastened together using conventional fastening mechanisms as shown in the drawings. One such fastening mechanism is a resilient tab 44 and a catch 46 which are secured together in a snap fit engagement. In one aspect, the resilient tab 44 is disposed on the lower wall 38 of the lower case 16 and the catch 46 is disposed on the upper side wall 34 of the upper case.

The cover 18 is mounted onto the upper case 14 and also secured together using a conventional fastening mechanism. In one example, the cover 18 includes a flexible tab 48 and the upper case 14 includes an upper catch 50 disposed on the upper side wall 34. However, it should be appreciated that any fastening mechanism currently known or later developed may be used herein without deviating from the scope of the appended claims.

Figure 3:
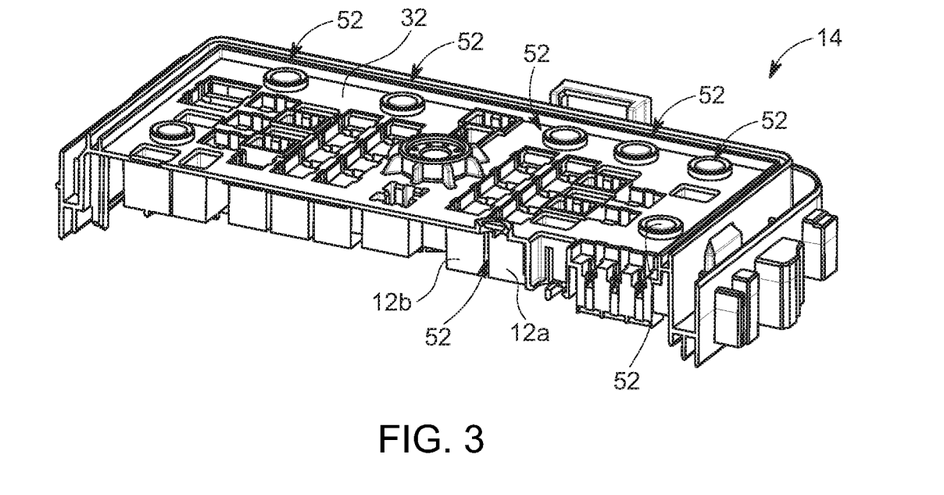
FIG. 3 is a cross-sectional view of the upper case shown in FIG. 1 taken along line 3-3.

With reference now to FIGS. 3-6 a description of the upper case 14 is provided. FIG. 3 is a cross-sectional view of the upper case 14 shown in FIG. 1 taken along line 3-3 is provided. The upper case 14 includes a vent 52. The vent is disposed on the base 32 of the upper case 14. As shown, the upper case 14 may include a plurality of vents 52, each of which may be strategically located so as to facilitate the escape of heat from the electric components 12, as described in more detail below.

An inner side wall 54 bounds the vent 52. The inner side wall 54 is a continuous wall which defines an opening of the vent 52. The inner side wall 54 has a height indicated by "H" so as to be raised above a top surface of the base 32 of the upper case 14.

Figure 7:
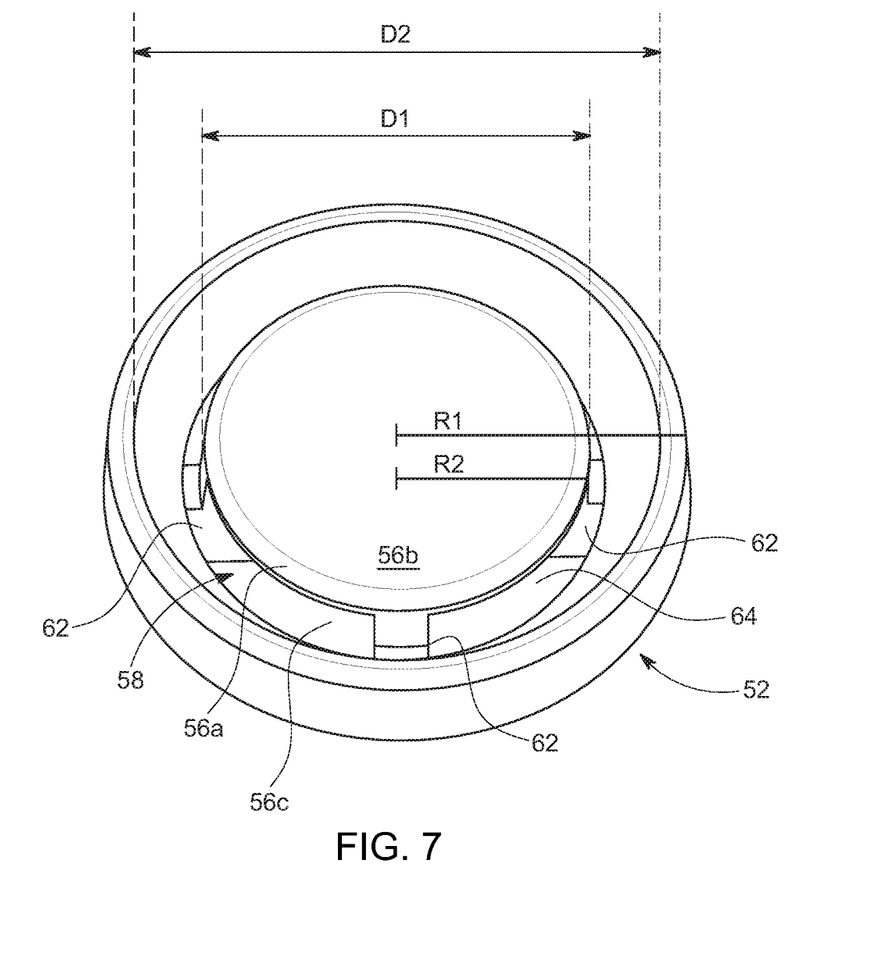
FIG. 7 is an isolated view of a vent according to one or more aspects described herein.

With reference also to FIG. 7, the upper case 14 further includes a shield 56. The shield 56 is disposed above the vent 52. The shield 56 has a diameter "D1" which is smaller than the diameter "D2" of the vent 52 and the inner side wall 54 bounds and is spaced apart from the peripheral edge of the shield 56 so as to define a gap 58 between the shield 56 and an inner surface 54a of the inner side wall 54. For illustrative purposes the vent 52 is shown as being a generally circular opening, and thus the gap 58 has an annular dimension. However, it should be appreciated that the vent 52 may be shaped otherwise such as square or triangular or the like. The outer surface of the inner side wall 54 has a constant radius which is indicated by "R2" and the inner surface 54a of the inner side wall 54 has a radius indicated by R1 that is smaller than radius R2 so as to define a thickness which is constant and bounds the vent 52.

With reference again to FIGS. 5 and 6, in one aspect the top portion of the inner surface 54a of the inner side wall 54 may be angled anywhere between 30 to 70 degrees relative to the plane of the top surface of the base 32 of the upper case 14. In one aspect the shield 56 may include an outer surface 56a that is angled inwardly from a top surface 56b of the shield 56 towards a bottom surface 56c of the shield 56. In one aspect the angle of the outer surface 56a of the shield 56 is the same as the angle of the inner surface 54a of the inner side wall 54.

Figure 5:
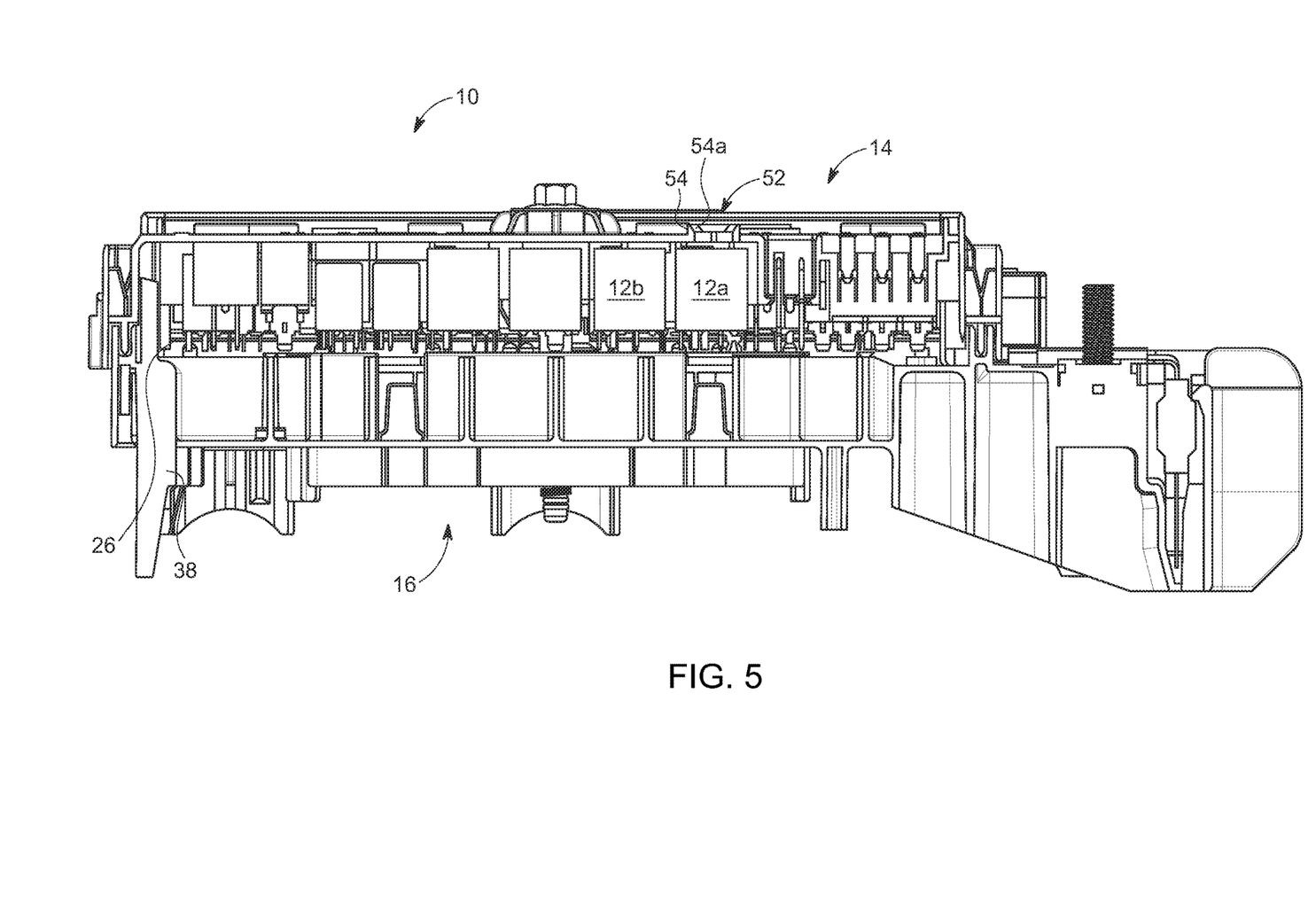
FIG. 5 is a cross-sectional view shown in FIG. 3 showing the upper case mounted to the lower case.
Figure 6:
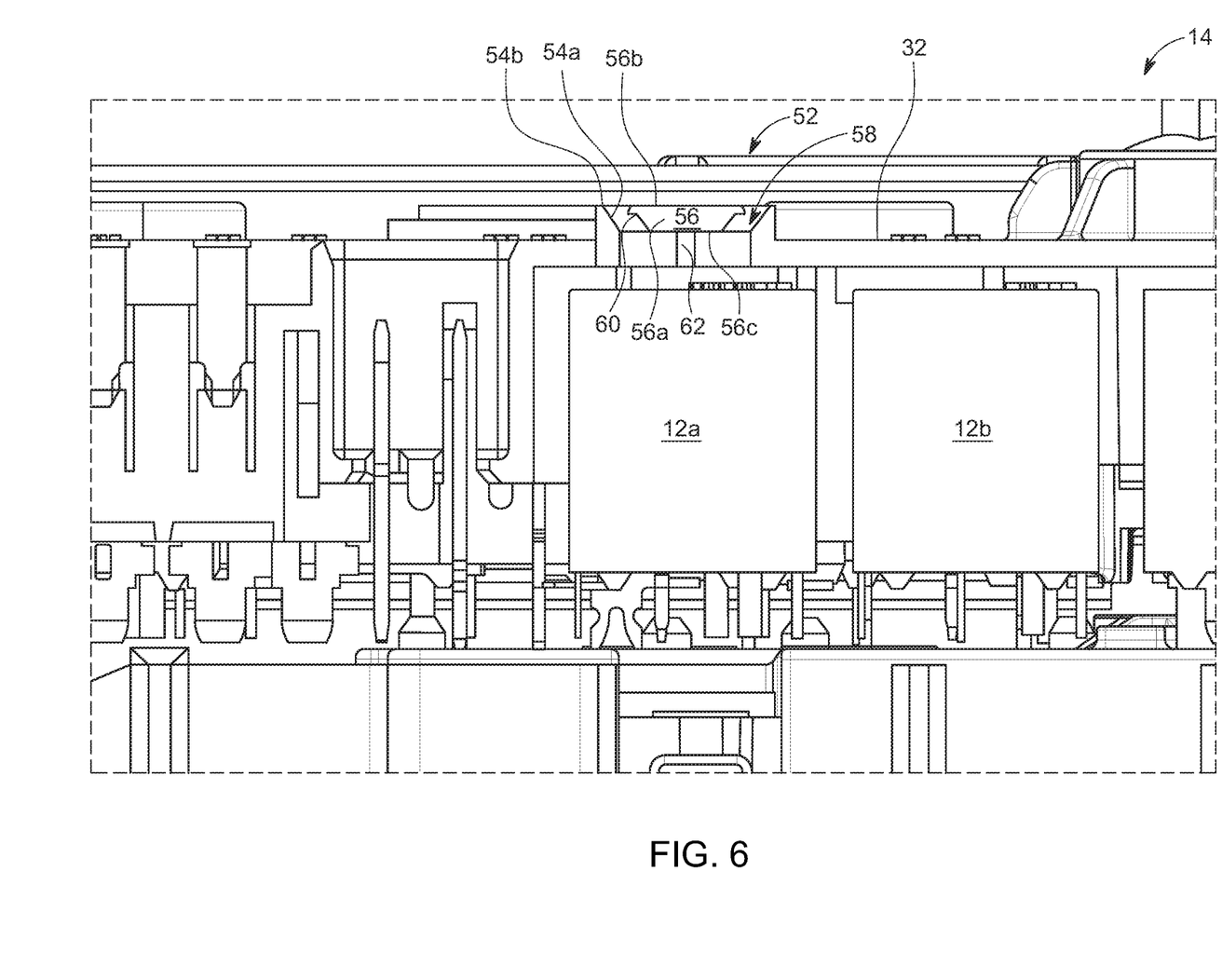
FIG. 6 is a close up view of FIG. 5.

The shield 56 may include an annular lip 60 which extends outwardly from the angled outer surface of the shield 56. The top surface 56b of the shield 56 may be a generally planar surface and may be coplanar with a top edge 54b of the inner side wall 54.

Figure 4:
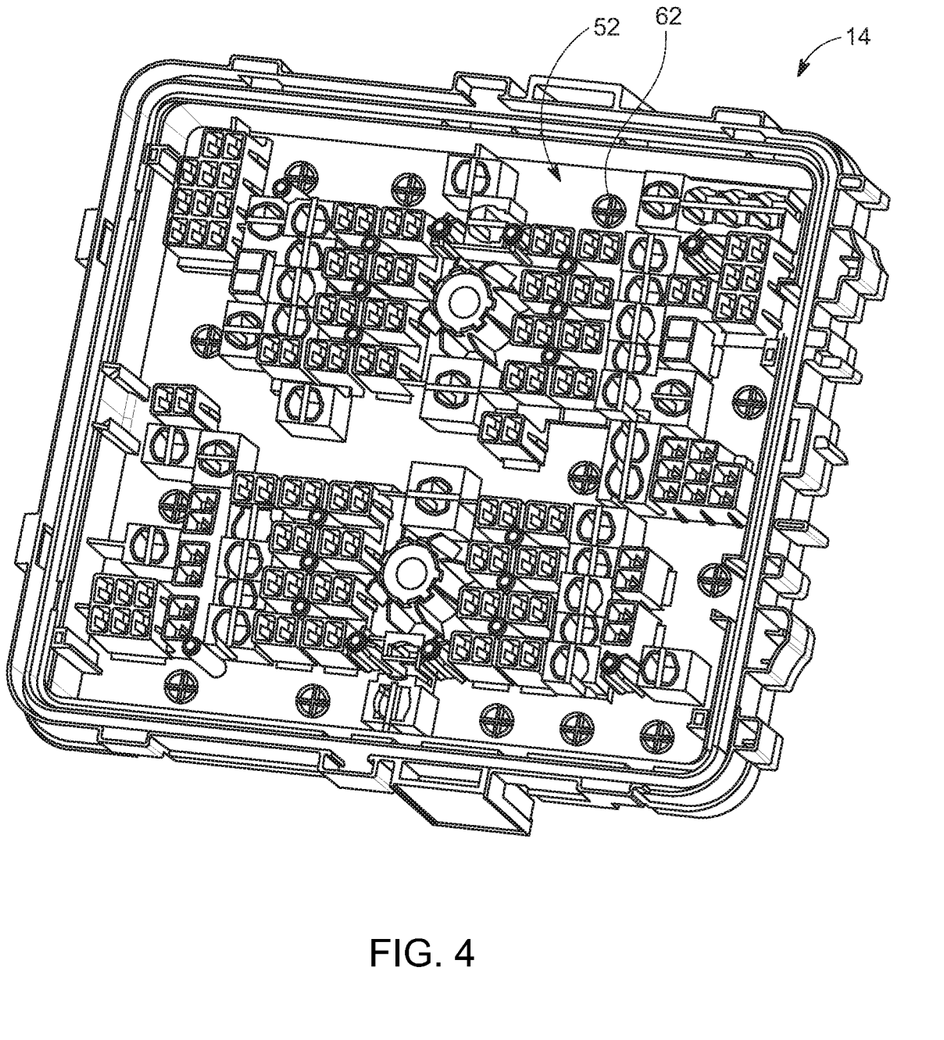
FIG. 4 is a view of the upper case taken from the bottom

With reference again to FIGS. 3-7 and now to FIG. 4, the upper case 14 further includes a support leg 62. FIG. 4 is a view of the upper case 14 taken from the bottom, which shows the support leg 62. The support leg 62 may be disposed on the bottom surface 56c of the shield 56 and extend to the inner surface 54a of the inner side wall 54 so as to support the shield 56 in a fixed suspension within the opening defined by the vent 52.

In one aspect the upper case 14 may include a plurality of support legs 62. The figures show that the upper case 14 includes four (4) support legs 62. The support legs 62 come together at the center of the shield 56 so as to form a cross-hair. In particular, the support legs extend radially from a center of the shield 56. However, it should be appreciated that only one support leg 62 may be used and that the upper case 14 may have a number of support legs 62 deviating from what is shown in the figures without narrowing the scope of the appended claims. The support legs 62 are generally an elongated member so as to define a plurality of inner gaps 64 (shown in FIG. 7) which are open to the gap 58 defined between the outer surface of the shield 56 and the inner surface 54a of the inner side wall 54.

With reference now to FIGS. 5 and 6, the vent 52 is configured to be registered above selected electric components 12 so as to provide a path for heat to escape. Thus, heat generated by the electronic component 12 rises and escapes through the vent 52. FIGS. 5 and 6 show one of the vents 52 disposed directly above an electric component 12a, whereas electric component 12b is covered by the base 32 of the upper case 14. In one aspect, the vent 52 may be centered and axially aligned with respect to a desired electric component 12a that is configured to generate heat sufficient to melt the upper case 14, such electric components 12a illustratively include high powered relay switches such as a Mosfet. For illustrative purposes, the upper case 14 is shown as having thirteen vents 52, each vent 52 defines an opening disposed above a respective one of a predetermined number of the plurality of electric components 12a, each of which are electric components 12a configured to generate heat sufficient to warp or damage the upper and/or lower case 14, 16. Accordingly, it should be appreciated that the number of vents 52 shown herein are provided for illustrative purposes and are not intended to limit the scope of the appended claims.

In a preferred embodiment, the vent 52 is configured to direct heat generated from the electric component 12a radially. Accordingly, as heat is generated from the electric component 12a, the heat is allowed to escape through the vent 52 and is further directed radially away from the center of the vent 52 so as to help spread and diffuse the heat throughout the entire power distribution box 10.

It should be appreciated that the number of vents 52 which are shown in the drawings is illustrative and not limiting to the scope of the appended claims. The vents 52 are positioned so as to be above electric components 12a which generate heat that is sufficient to melt the upper case 14. As such The vent 52 helps prevent damage to the upper case 14 which may be caused by heat defamation and further helps prevent the upper case 14 from melting and damaging the electric components 12.

While particular embodiments have been illustrated and described herein, it should be appreciated and understood that various other changes and modifications may be made without departing from the spirit and scope of the claim subject matter. Moreover, although various aspects of the claim subject matter have been described herein, such aspects need not be utilized in combination. It is therefore intended that the appended claims cover all such changes and modifications that are within the scope of the claim subject matter.

The invention claimed is:

1. An upper case for use in a power distribution box, the power distribution box is configured to house a plurality of electric components, the power distribution box having a lower case coupled to the upper case so as to form a storage compartment, the plurality of electric components disposed within the storage compartment, the upper case comprising:
   a base and an upper side wall bounding the base;
   a vent disposed on the base;
   an inner side wall bounds the vent so as to be raised above a top surface of the upper case; and
   a shield is disposed above the vent and the inner side wall being concentric to the shield, and wherein an outer surface of the inner side wall has a constant radius.

2. The power distribution box as set forth in claim 1, wherein the vent is a generally circular opening.

3. The power distribution box as set forth in claim 1, wherein an inner surface of the inner side wall is angled.

4. The power distribution box as set forth in claim 1, wherein an outer surface of the shield is angled inwardly from a top surface of the shield towards a bottom surface of the shield.

5. The power distribution box as set forth in claim 4, wherein the shield includes an annular lip.

6. The power distribution box as set forth in claim 1, wherein a top surface of the shield is a generally planar surface.

7. The power distribution box as set forth in claim 6, wherein the top surface of the shield is coplanar with a top edge of the inner side wall.

8. The power distribution box as set forth in claim 1, further including a support leg disposed on a bottom surface of the shield and connected to the upper case so as to hold the shield in suspension above the vent.

9. A power distribution box configured to house a plurality of electric components, the power distribution box comprising:
   a lower case configured to hold the plurality of electric components;
   an upper case mounted to the lower case so as to cover and protect the plurality of electric;
   a vent disposed on the upper case, the vent being an opening disposed above a respective one of a predetermined number of the plurality of electric components;
   an inner side wall bounds the opening so as to be raised above a top surface of the upper case; and
   a shield is disposed above the opening and the inner side wall being concentric to the shield, and wherein an outer surface of the inner side wall has a constant radius.

10. The power distribution box as set forth in claim 9, wherein the opening is generally circular.

11. The power distribution box as set forth in claim 9, wherein an inner surface of the inner side wall is angled.

12. The power distribution box as set forth in claim 9, wherein an outer surface of the shield is angled inwardly from a top surface of the shield towards a bottom surface of the shield.

13. The power distribution box as set forth in claim 12, wherein the shield includes an annular lip.

14. The power distribution box as set forth in claim 9, wherein a top surface of the shield is a generally planar surface.

15. The power distribution box as set forth in claim 14, wherein the top surface of the shield is coplanar with a top edge of the inner side wall.

16. The power distribution box as set forth in claim 9, further including a support leg disposed on a bottom surface of the shield and connected to the upper case so as to hold the shield in suspension above the vent.

17. The power distribution box as set forth in claim 16, wherein the support leg is a plurality of support legs.

18. The power distribution box as set forth in claim 17, wherein each of the plurality of support legs are equally spaced apart from each other and extend radially from a center of the shield.

* * * * *